(12) United States Patent
Waddell et al.

(10) Patent No.: US 8,122,572 B2
(45) Date of Patent: Feb. 28, 2012

(54) MARKING AND FASTENING DEVICE AND METHOD OF USING SAME

(75) Inventors: Raymond J. Waddell, Vernon (CA); Dean A. Myrfield, Vernon (CA)

(73) Assignee: EZ-Snap Products Inc., Vernon (CA)

( * ) Notice: Subject to any disclaimer, the term of this patent is extended or adjusted under 35 U.S.C. 154(b) by 757 days.

(21) Appl. No.: 12/289,065

(22) Filed: Oct. 20, 2008

(65) Prior Publication Data

US 2009/0113674 A1     May 7, 2009

Related U.S. Application Data

(63) Continuation-in-part of application No. 11/241,441, filed on Sep. 29, 2005, now Pat. No. 7,735,235.

(51) Int. Cl.
*A44B 1/34* (2006.01)
*A44B 17/00* (2006.01)

(52) U.S. Cl. ............... 24/110; 24/453; 24/103; 24/104; 24/90.1; 411/509; 33/664; 33/578; 33/669; 114/361

(58) Field of Classification Search .................. None
See application file for complete search history.

(56) References Cited

U.S. PATENT DOCUMENTS 1,594,416 A    8/1926   Kellogg
(Continued)

FOREIGN PATENT DOCUMENTS

CA     2333092 A1    12/1999
(Continued)

OTHER PUBLICATIONS

International Search Report for PCT/CA2008/001852, International Searching Authority, Jun. 23, 2009, pp. 1-3.

*Primary Examiner* — Jack W. Lavinder
(74) *Attorney, Agent, or Firm* — Bull, Housser & Tupper LLP

(57) ABSTRACT

A fastening device and a method of using same is provided. The fastening device includes a male member having a projection on a first side and a securing means on a second opposing side. A female member configured to receive the projection detachably secures the female member onto the male member. The female member and the male member comprises a ratchet system to removeably secure the female member onto the male member. The securing means on the second opposing side of the male member is configured to mate with a corresponding securing member mounted on an object. By securing a material such as a shade screen or a tarp on the male member by mating the male member with the female member, the shade screen or tarp may be detachably fastened onto an object.

20 Claims, 5 Drawing Sheets

U.S. PATENT DOCUMENTS

| | | |
|---|---|---|
| 3,088,295 A | 5/1963 | Haines |
| D205,010 S | 6/1966 | Swenden |
| 4,507,344 A | 3/1985 | Baughman |
| 4,557,455 A | 12/1985 | Benjamin |
| 4,608,734 A | 9/1986 | Schiller |
| D286,373 S | 10/1986 | Hill |
| D292,780 S | 11/1987 | Galask |
| 5,095,636 A | 3/1992 | Arnold |
| 5,212,851 A | 5/1993 | Wantanabe |
| D337,255 S | 7/1993 | Novelli, Sr. |
| 5,490,309 A | 2/1996 | Velasquez et al. |
| 5,933,929 A | 8/1999 | Kawakami et al. |
| D466,001 S | 11/2002 | Monson |
| D498,414 S | 11/2004 | Yoneoka |
| D500,245 S | 12/2004 | Okada |
| D602,161 S | 10/2009 | Yazdi |
| D604,786 S | 11/2009 | Millar |
| 2005/0188510 A1 | 9/2005 | Retamal |
| 2005/0235462 A1 | 10/2005 | Takahashi et al. |

FOREIGN PATENT DOCUMENTS

| | | |
|---|---|---|
| CA | 2521568 A1 | 3/2007 |

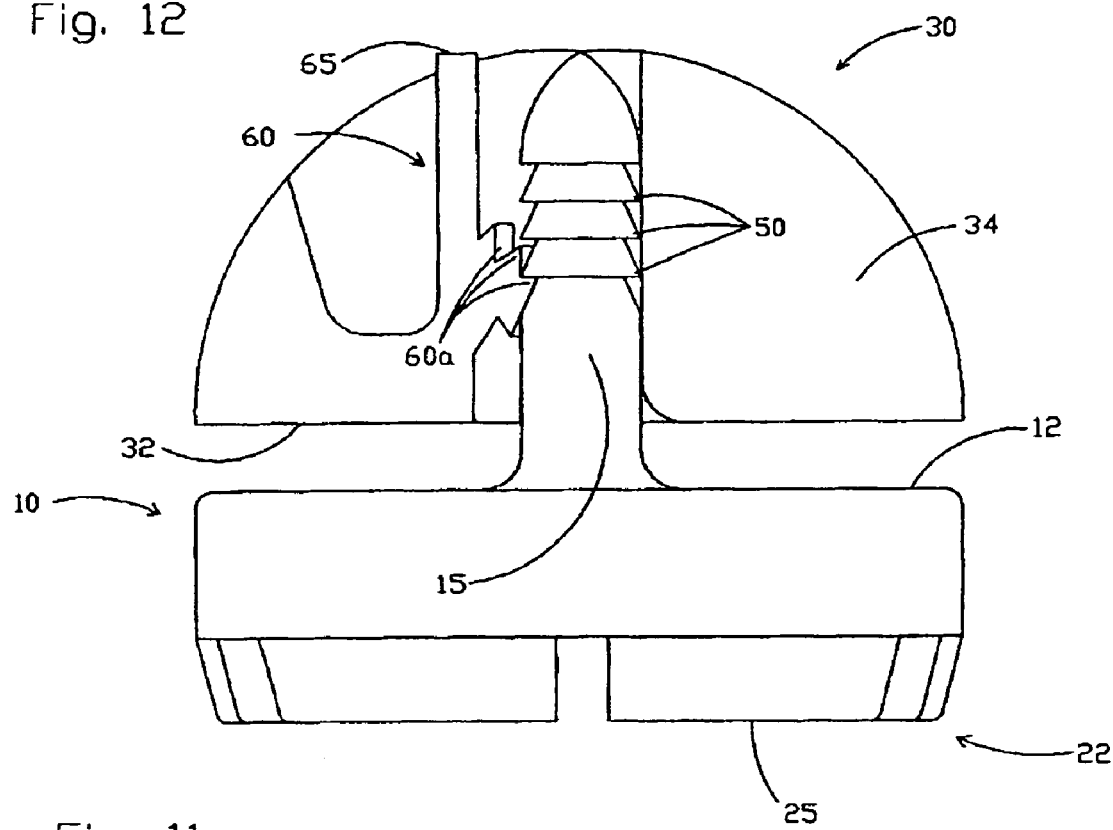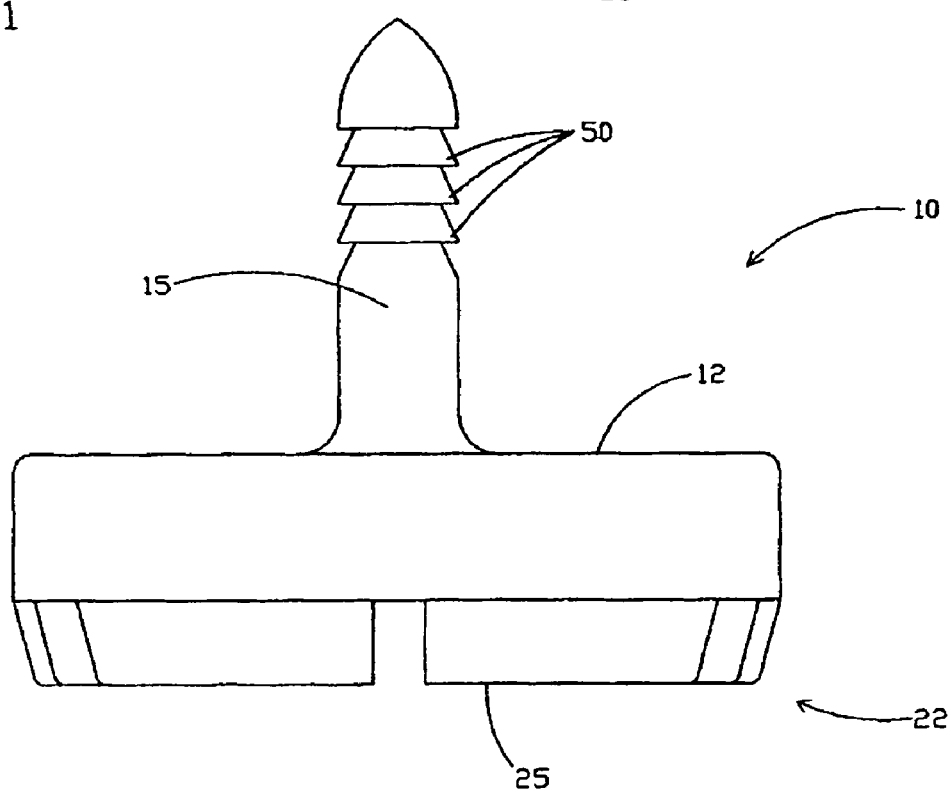

MARKING AND FASTENING DEVICE AND METHOD OF USING SAME

PRIORITY CLAIM

The current application is a continuation-in-part of U.S. patent application Ser. No. 11/241,441 entitled MARKING AND FASTENING DEVICE AND METHOD OF USING SAME filed on the 29 Sep. 2005.

FIELD OF INVENTION

The present invention relates generally to a fastener assembly, and more particularly, it relates to a marking and fastening device for attachment onto a material.

BACKGROUND OF THE INVENTION

Covers or tarps are typically used to cover and protect various objects from the elements. For example, tarps or covers may be fastened to a boat so as to protect the cabin or seating area of the boat from the rain and other falling debris. Tarps and covers may also be fastened over truck loads to cover the cargo and inhibit loose debris from dislodging. Window shade covers or screens may be fastened to windows and skylights to protect against UV rays and to reduce the heat from the sun.

Such covers or tarps are typically fastened to the target object by way of male/female securing devices such as snap fasteners, lifi-a-dot fasteners, and turnbuckles. In the case of snap fasteners, male screw studs are typically mounted around the perimeter of the object, such as around the perimeter of the seating area of a boat. Female sockets are mounted on the tarp material such that the tarp may be detachably fastened onto the male screw studs. To properly fit the tarp over the seating area of the boat, the position of the female sockets must correspond to the fixed position of the male screw studs. The female sockets are usually permanently mounted on selected locations of the tarp material so as to be engageable with the corresponding male screw studs mounted at fixed positions along the perimeter of the boat.

Typically, the female sockets are permanently mounted to the tarp material by riveting. The proper positioning of the female sockets on the tarp material is accomplished by securing the tarp material over the object and marking areas of the tarp material that correspond to the location of each of the male screw studs. The tarp material is then removed from the object to permanently attach the female sockets onto the marked areas on the tarp material.

The marking of the tarp material for proper positioning of the female sockets is a time consuming process and potentially subject to error. The process of securing the tarp material over the object, for example, by way of clamps, is a laborious process that may require multiple re-adjustments and re-securing of the clamps to properly position the tarp material over the object with the appropriate tension. Furthermore, because the female sockets are permanently secured onto the tarp material, any inaccuracies in marking of the tarp may be a costly and time consuming mistake to correct. For example, if the female socket is incorrectly secured onto the tarp material, removal of the female socket can only be accomplished by destroying the female socket such that it may not be reused again.

Applicant is aware of U.S. Pat. No. 5,095, 636 issued on Mar. 17, 1992 to Arnold which describes a fabric cover marking device and method for marking the location on a fabric cover for a female fastener portion engageable with a complementary male fastener portion mounted on a structure to be covered.

Applicant is also aware of U.S. Pat. No. 4,608, 734 issued on Sep. 2, 1986 to Schiller which describes a quick release threadless fastener for connecting two pieces of material, the fastener including a male and a female fastener assembly each having a fastener element that are detachably engageable with each other.

Applicant is further aware of U.S. Pat. No. 5,490, 309 issued on Feb. 13, 1996 to Velasquez et al. which describes a fastener assembly that is readily attached to fabric material without need of sewing, the fastener assembly including a pair of interlocking male and female members, each for placement on opposite side of the fabric material.

The problem with existing fasteners and fastener assemblies is that none of such devices are operable to mark and fasten onto a material. The device described in Arnold discloses a fabric cover marking device but the device itself may not be fastened to the fabric cover. The devices described in Schiller and Velasquez et al. fail to describe a device that may also function as a marking device.

Furthermore, none of the prior art devices provide for a detachably securable female member which enables re-usability of the male and female member for different applications and/or convenient adjustability of the material at any time so as to suitably position the material on the male member to align the male member with a corresponding securing member. Therefore, an unaddressed need for an improved fastening device exists to overcome the inadequacies and deficiencies in the prior art.

SUMMARY OF THE INVENTION

It is an object of the present invention to provide a fastening device that also acts as a marking device.

It is another object of the present invention to provide a marking and fastening device that may be detachably attachable to a material without use of conventional attachment means.

An apparatus for marking a material and mounting the apparatus on the material is provided wherein the apparatus is operable to fasten the material on to an object. The apparatus includes a first member removeably attachable to the object, the first member being adapted to mark and receive the material, and a second member adapted to removeably secure the material received by the first member on the first member. The first member and the second member comprises a ratchet system to removeably secure the second member onto the first member.

The first member includes a projection projecting from a first side of the first member, the projection configured to mark and puncture the material. The projection comprises a plurality of teeth. A securing means on a second side opposite the first side of the first member removeably attaches the material secured onto the apparatus to a corresponding securing member mounted on the object. The securing means may be a female socket and the corresponding securing member may be a male stud, the female socket and the male stud forming a detachably securable snap fastener.

The second member defines an aperture configured to detachably receive the projection projecting from the first side of the first member. The second member comprises a pawl disposed within the aperture wherein the pawl is configured to engage the plurality of teeth on the projection. When the projection is inserted in the aperture in a first direction, the pawl engages the plurality of teeth such that the pawl substantially inhibits the projection from moving in a second direction opposite the first direction. A lever tab releases the pawl from the plurality of teeth when the lever tab is displaced from a first engaged position to a second release position. When the lever tab is displaced from the first engaged position to the second release position, the projection may move in the second direction to detach the second member from the first member. In an embodiment of the invention, the apparatus may also include on the first side of the first member a plurality of teeth for engaging the material.

A method of mounting a marking and fastening device onto a material so as to fasten the material onto an object is also disclosed. The method includes the steps of: mounting the material on a first member by puncturing the material with a projection projecting from a first side of the first member, the projection comprising a plurality of teeth; detachably securing the first member onto the material by mating the first member with a second member, the second member defining an aperture configured to receive the projection and the second member comprising a pawl disposed within the aperture wherein the pawl is configured to engage the plurality of teeth on the projection; and detachably mating a securing means on a second side of the first member with a corresponding securing member mounted on the object so as to fasten the material onto the object. The securing means on the second side of the first member may be a female socket and the securing member mounted on the object may be a male stud, the female socket and the male stud thereby forming a detachably securable snap fastener.

When the projection is inserted in the aperture in a first direction, the pawl disposed within the aperture engages the plurality of teeth on the projection such that the pawl substantially inhibits the projection from moving in a second direction opposite the first direction. Preferably, the second member further comprises a lever tab wherein the lever tab is configured to release the pawl from the plurality of teeth when the lever tab is displaced from a first engaged position to a second release position. When the lever tab is displaced from the first engaged position to the second release position, the projection may move in the second direction so as to disengage the second member from the first member.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 11 is a side view of the male member as seen in FIG. 1 wherein the prong includes a plurality of teeth of a ratchet system;

FIG. 12 is a cross sectional view of the male member as seen in FIG. 9 detachably secured onto the female member as seen in FIG. 10.

DETAILED DESCRIPTION OF THE PREFERRED EMBODIMENT

Figure 7:
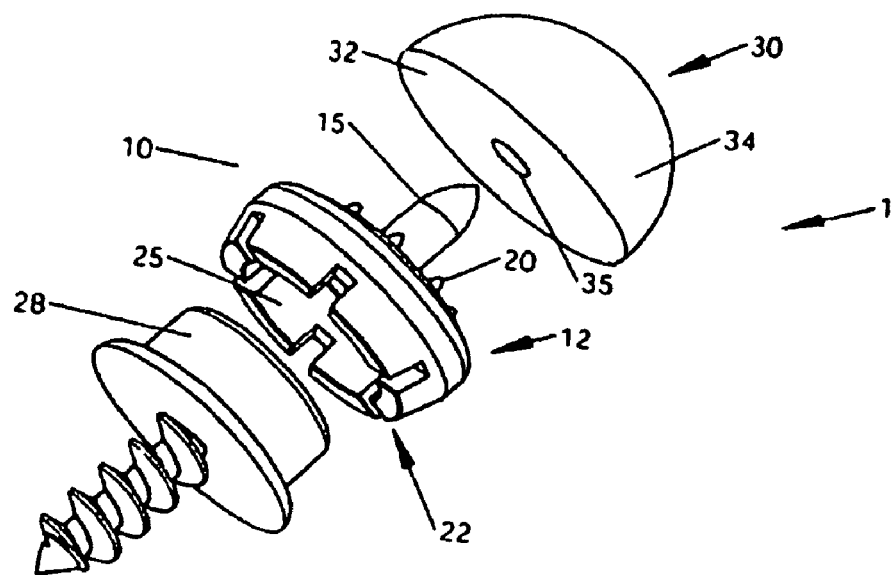
FIG. 7 is an exploded view of the male member, as seen in FIG. 1, detachably received at the first side by the female member, as seen in FIG. 4 and detachably secured at the second opposing side onto a stud.
Figure 8:
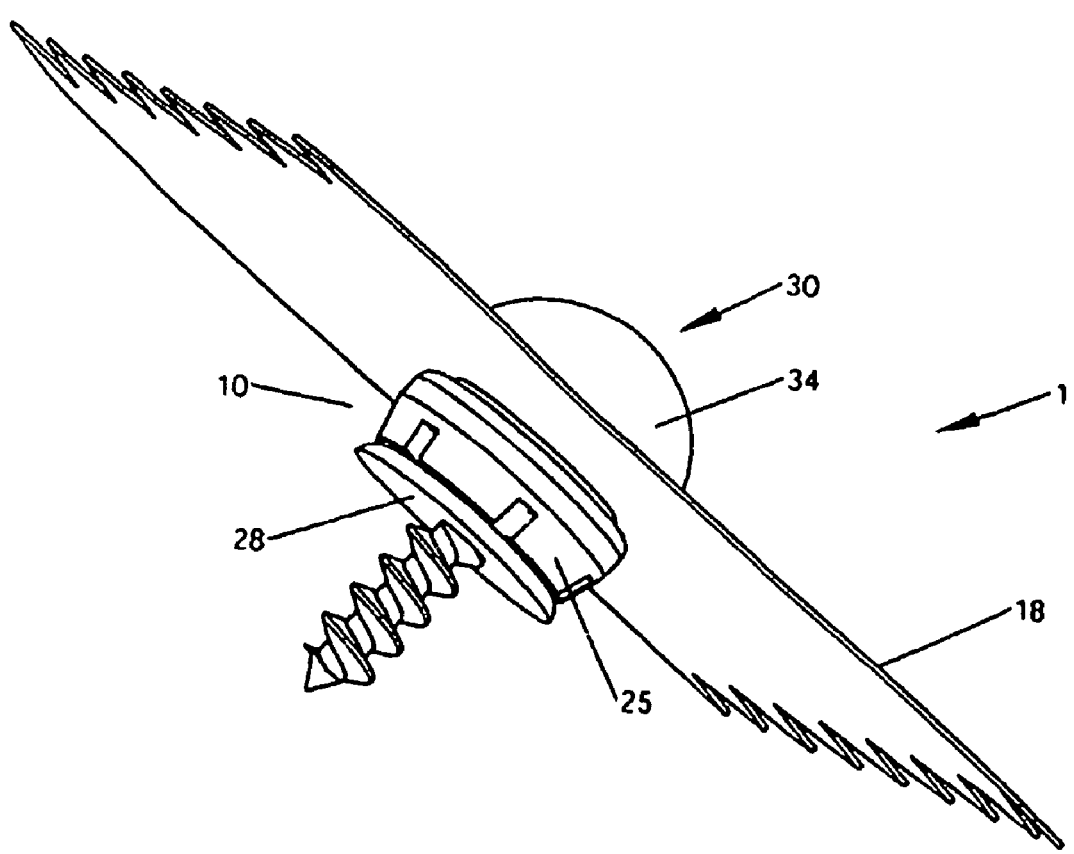
FIG. 8 is a side view of the fastening device detachably secured at the second opposing side onto the stud, as seen in FIG. 7.

With reference to FIGS. 1 to 12, the marking and fastening device I of the present invention includes a male member 10 and a female-member 30. Marking and fastening device 1 is operable to mark and fasten a material 18, as shown in FIG. 8 and described in greater detail below.

Figure 1:
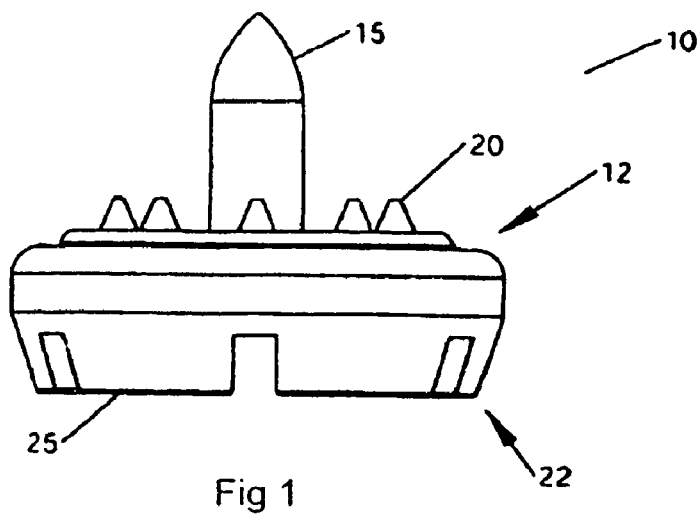
FIG. 1 is a side view of a male member having a prong on a first side and a receiving means on a second opposing side.
Figure 2:
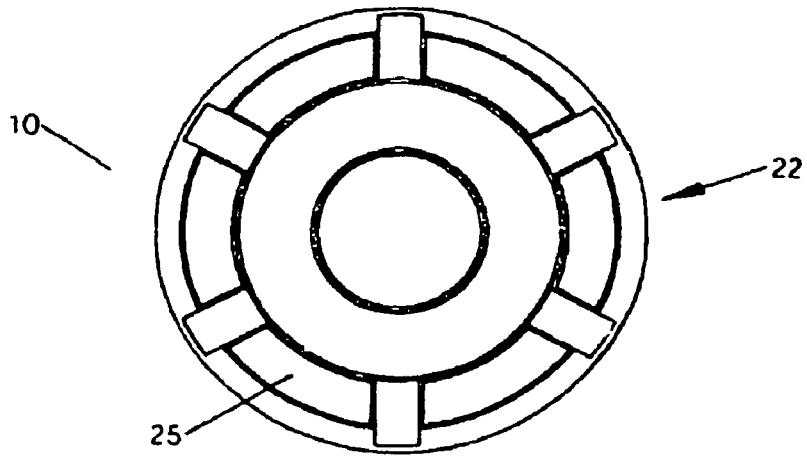
FIG. 2 is a bottom view of the second opposing side of the male member, as seen in FIG. 1.
Figure 3:
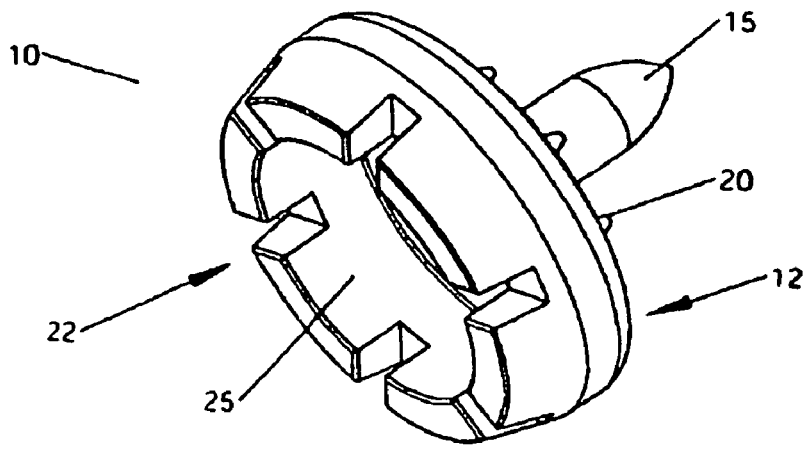
FIG. 3 is a perspective view of the male member, as seen in FIG. 1.

Referring to FIGS. 1 to 3, male member 10 in accordance with a first embodiment has a first side 12 and a second side 22 opposite first side 12. On first side 12, male member 10 includes a projection such as a prong 15. Prong 15 may be integrally formed on first side 12 of male member 10. Alternatively, prong 15 may be separate from male member 10 and attached to or otherwise coupled with first side 12 of male member 10. Preferably, prong 15 is formed on first side 12 of male member 10 and is configured to puncture any type of material 18. In an embodiment of the invention, prong 15 may be sharpened so as to enable prong 15 to puncture material 18. Material 18 may be any material capable of being punctured by prong 15, including but not limited to materials typically used to make tarps such as heavy duty polyethylene tarp material, nylon tarpaulin fabric, polyester mesh fabrics, or vinyl fabrics. Marking material 18 of a lighter fabric such as canvas and cotton is contemplated and within the scope of the present invention. Prong 15 and male member 10 may be made of any durable rigid material so as to be able to provide sufficient strength to prong 15 to puncture material 18. The durable rigid material that male member 10 and prong 15 may be made of include but are not limited to durable plastic materials, such as delrin, or various types of metal, such as stainless steel.

In an embodiment of the invention, first side 12 of male member 10 also includes a plurality of teeth 20. Plurality of teeth 20 may be made of the same durable material as male member 10. Teeth 20 are configured to engage material 18 to secure material 18 onto first side 12 of male member 10 when material 18 is removably mounted on male member 10 by puncturing material 18 with prong 15. Preferably, teeth 20 are sharp so as to engage or hook onto material 18 when material 18 is mounted on male member 10.

On second side 22, male member 10 includes a securing means 25 such as a female socket of a conventional snap fastener. Securing means 25 is preferably integral to male member 10. Alternatively, securing means 25 may be separate from male member 10 and attached or otherwise coupled to second side 22 of male member 10. Securing means 25 may be made of the same durable material as male member 10. Additionally or alternatively, securing means 25 may be a male member or a female member of any conventional fastening device configured to mate with a corresponding female or male member 28, respectively. For example, securing means 25 may be the male stud or eyelet portion or the female socket or cap portion of a conventional snap fastener or securing means 25 may be the male hook portion or the female loop portion of a conventional hook and loop fastener commonly known as VELCRO™. Preferably, in the first embodiment, securing means 25 is a female socket portion formed integrally on second side 22 of male member 10 wherein the female socket portion is configured to detachably mate with a corresponding male member 28 such as a male stud portion so as to form a detachably securable snap fastener. For example, in use, securing means 25 may be a female socket portion configured to detachably mate with a corresponding male screw stud 28 mounted on an object such as a boat.

Referring to FIGS. 4 to 8, female member 30 has a first side 32 which is generally planar and a second side 34 opposite first side 32, which may be generally dome shaped, although other geometrical configurations of female member 30 are contemplated and within the scope of the present invention. Preferably, female member 30 is made of the same durable material as male member 10.

Figure 4:
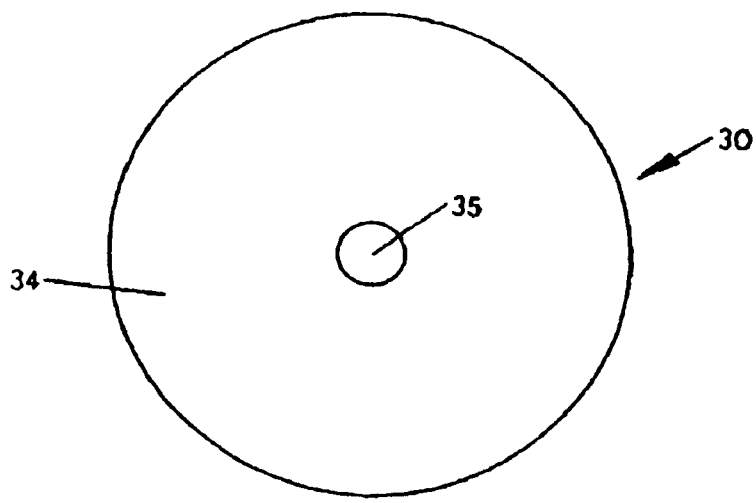
FIG. 4 is a plan view of a female member having a receiving means.
Figure 5:
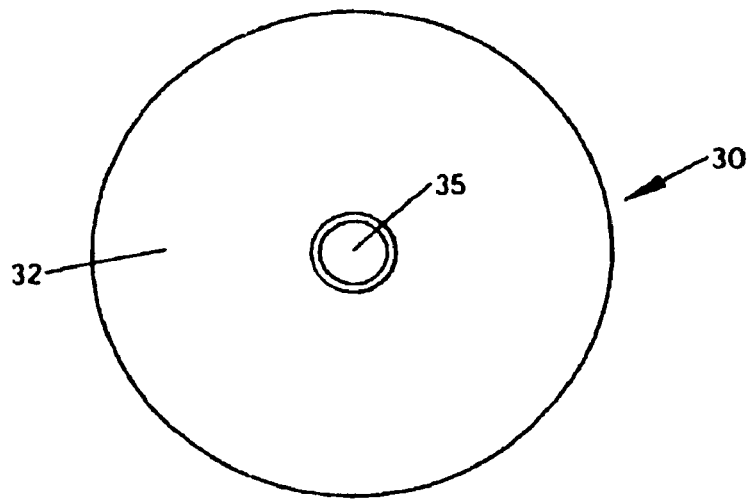
FIG. 5 is a bottom view of the female member as seen in FIG. 4.
Figure 6:
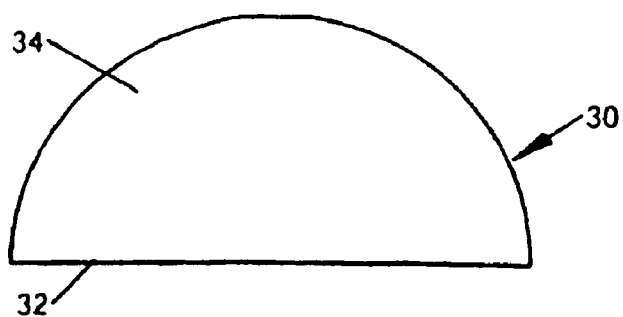
FIG. 6 is a side view of a female member as seen in FIG. 4.

Female member 30 is configured to mate with male member 10 so as to detachably secure female member 30 onto male member 10. In an embodiment of the invention, female member 30 is operable to receive prong 15 of male member 10 into an aperture 35 sized and shaped to receive prong 15. As shown in FIGS. 4 and 5, aperture 35 may extend through female member 30 along a central axis generally perpendicular to first side 32 of female member 30. Female member 30 may detachably secure onto male member 10 by inserting prong 15 into aperture 35 such that prong 15 frictionally engages the interior surface of aperture 35 to detachably secure prong 15 within aperture 35. Female member 30 may have any dimensions that permit female member 30 to detachably mate with male member 10.

As seen in FIGS. 9 to 12, in a preferred embodiment of the present invention, male member 10 and female member 30 form a ratchet and pawl system wherein when prong 15 of male member 10 is inserted in aperture 35 of female member 30, male member 10 is substantially inhibited from being removed from female member 35 unless a lever tab 65 causes a pawl 60 of the ratchet and pawl system to release from a plurality of teeth 50 of the ratchet, as described in greater detail below. In this preferred embodiment of the invention, the ratchet and pawl system only permits prong 15 to freely move in one direction, namely, into aperture 35 from first side 32 towards second side 34, so as to firmly secure male member 10 and female 30 together unless the ratchet and pawl system is manually released by lever tab 65 to allow for male member 10 and female 30 to detach and disengage.

As seen in FIGS. 11 to 12, prong 15 includes a plurality of teeth 50. Teeth 50 may be slanted at an angle such that when teeth 50 are moving in a first direction, for example, when prong 15 is inserted into aperture 35, pawl 60 disposed within aperture 35 (as described in greater detail below), will slide over each tooth 50. When prong 15 is inserted into aperture 35, pawl 60 slides over each tooth 50 and engages in the groove between each tooth 50, thereby preventing movement in a second direction opposite the first direction. As prong 15 is inserted further into aperture 35, thereby causing pawl 60 to engage in the groove between multiple teeth 50, the engagement between male member 10 and female member 30 tightens. For greater clarity and by way of example, when prong 15 is disposed within aperture 35, pawl 60 and teeth 50 of the ratchet system engage. If force is applied to either male member 10 or female member 30 in an effort to cause male member 10 and female member 30 to disengage from each other, such force causes more teeth 60*a* on pawl 60 to engage in the groove between the plurality of teeth 50 on prong 15, thereby causing the engagement between pawl 60 and teeth 50 to further tighten.

Figure 9:
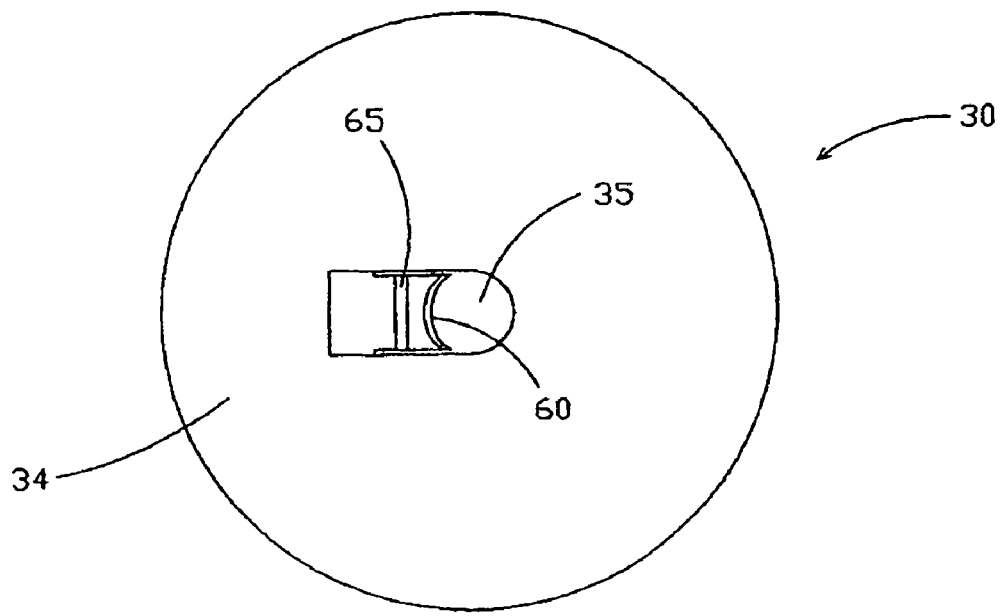
FIG. 9 is a plan view of the female member as seen in FIG. 3 wherein the receiving means incorporates a pawl of a ratchet system.
Figure 10:
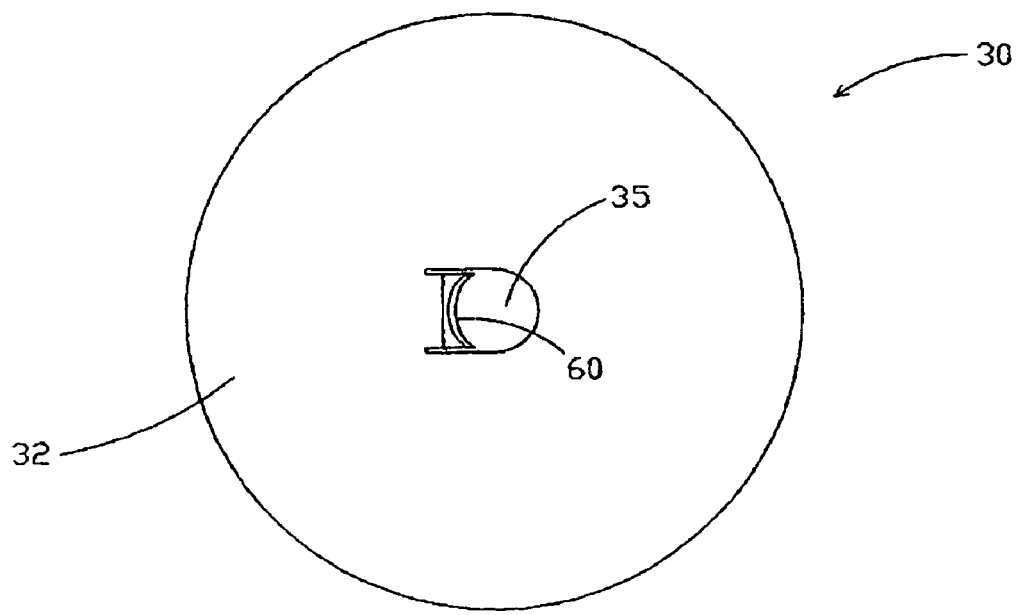
FIG. 10 is a bottom view of the female member seen in FIG. 10.

As seen in FIGS. 9 to 10, female member further comprises pawl 60 disposed within aperture 35 wherein teeth 60*a* of pawl 60 are configured to engage teeth 50 on prong 15 when prong 15 is inserted within aperture 35. Teeth 60*a* of pawl 60 may be slanted at an angle such that when teeth 50 are moving in a first direction, for example, when prong 15 is inserted into aperture 35, teeth 50 will slide over pawl 60 and be engaged in the groove between each tooth 50, thereby preventing movement in a second direction opposite the first direction.

As seen in FIG. 12, in an embodiment of the invention, pawl 60 further comprises lever tab 65 that extends beyond aperture 35 on second side 34. Lever tab 65 may be displaced from a first engaged position to a second release position to release the spring tension or compression that causes pawl 60 to engage teeth 50. Advantageously and unlike prior art ratchet system devices that are generally single-use devices, lever tab 65 allows users to easily and conveniently release pawl 60 such that male member 10 and female member 30 may disengage without damaging either part such that they may be used again. While some prior art ratchet system devices are designed for reuse, in most cases, an object, such as a pin or the a screwdriver will be needed to be interposed between the pawl and ratchet to cause the ratchet system to release. Advantageously, in the present invention, by exerting minimal pressure on lever tab 65 to displace lever tab 65 from the first engaged position to the second release position, a user may easily release the spring tension or compression that causes pawl 60 to engage teeth 50 such that male member 10 and female member 30 may be easily disengaged.

Operation

Referring to FIGS. 7 and 8, the marking and fastening device 1 of the present invention may be used to mark material 18 and then detachably fastened onto material 18. Securing means 25 on second side 22 of male member 10 may therefore detachably fasten onto a corresponding securing member 28 mounted on or otherwise coupled with an object such as a boat (not shown), for example.

In a typical operation, securing means 25 such as female sockets of male member 10 are removeably attached to securing members 28 such as male stud portions mounted on an object, such as a boat, thereby exposing prong 15 in a desired pattern along the surface of the object. Material 18, which may be a tarp, may be laid across the portion of the object defined by the pattern of exposed prongs 15 and stretched and/or aligned as desired. After laying material 18 across the exposed prongs 15, pressure may be applied to material 18 or portions thereof so as to cause one or more prongs 15 to mark material 18, including puncturing material 18 to indicate one or more locations on material 18 where female member 30 may be removeably attached to secure male member 10 and female member 30 on material 18. After puncturing material 18 with prongs 15 of male member 10, teeth 20 of male member 10 may assist in securing the position of material 18 on male member 10. Advantageously, female member 30 detachably secures onto male member 10 by inserting prong 15 into aperture 35.

In a preferred embodiment of the invention, when prong 15 is inserted into aperture 35 to secure female member 30 onto male member 10, teeth 50 on prong 15 engage pawl 60 disposed within aperture 35, similar to a ratchet and pawl system. Should an error be made in the positioning of male member 10 on material 18, lever tab 65 may be used to disengage pawl 60 from teeth 50 such that female member 30 may be detached from male member 10 to allow for adjustments. In an alternate embodiment, prong 15 frictionally engages the interior surface of aperture 35 to detachably secure prong 15 within aperture 35. Typically, female member 30 is detachably secured to male member 10 such that first side 32 of female member 30 is adjacent material 18, as shown in FIG. 8.

Once material 18 is positioned on male member 10 and secured into position by inserting prong 15 into aperture 35 to secure female member 30 onto male member 10, each securing means 25 is operable to detachably mate with a corresponding stud 28 to detachably fasten material 18 onto the object. As such, material 18 may be secured onto the object when needed, such as when shade or cover is desired by mating each securing means 25 with each corresponding securing member 28. When the shade or cover is not required, material 18 may be removed from the object by detaching each securing means 25 from its corresponding securing member 28.

Advantageously and unlike the prior art, if male member 10 is wrongly positioned on material 18, female member 30 may be detached, without deforming or otherwise damaging female member 30, male member 10, or material 18, to release material 18 from prong 15 such that male member 10 may be repositioned for marking and/or puncturing at an alternate location. Advantageously, male member 10 and female member 30 may be detached and 25 reused, even if they were previously secured onto material 18. For example, material 18 may be a boat tarp for securing over a boat to protect the open seating area of the boat from the elements. Male member 10 may be adjustably positioned along material 18 such that the position of socket 25 corresponds with the fixed position of each stud 28 mounted on the boat. Male member 10 and female member 30 may conveniently be adjustably mounted on the 30 material 18 by detaching female member 30 from material 18, releasing male member 10 from material 18 and re-puncturing material 18 with the prong 15 of the male member 10 at a new location of material 18, and re-attaching female member 30 to the male member 10 at the new location. Once material 18 is properly positioned on male member 10 by detachably securing female member 30 on male member 10, socket 25 may be detachably attached to each corresponding stud 28.

In the preferred embodiment of the invention as shown in FIGS. 9 to 12, when prong 15 is inserted into aperture 35 in the first direction, sufficient force may be applied in the first direction such that teeth 50 slide past pawl 60 thereby causing pawl 60 to engage in between the grooves of teeth 50. As in a typical ratchet and pawl system, when pawl 60 engages in between the grooves of teeth 50, prong 15 may only freely move in one direction, namely, in the first direction from first side 32 towards second side 34, so as to firmly secure male member 10 and female 30 together unless teeth 50 and pawl 60 are manually released by displacing lever tab 65 from the first engaged position to the second release position to allow for pawl 60 to release from teeth 50 so that male member 10 and female 30 may detach and disengage. Advantageously, by displacing lever tab 65 to the release position to release the spring tension and compression that causes pawl 60 to engage teeth 50, female member 30 may be detachably securable onto male member 10. If lever tab 65 is not displaced in the second release position, any force applied to either male member 10 or female member 30 in an effort to cause male member 10 and female member 30 to disengage from each other will cause teeth 60a on pawl 60 to tightly engage in the groove between the plurality of teeth 50 on prong 15.

From the foregoing description, it may be seen that the device formed in accordance with the present invention incorporates many novel features and offers significant advantages over those currently available. While the presently preferred embodiment of the invention has been illustrated and described, it is to be understood that within the scope of the appended claims, various changes can be made therein without the departing from the scope of the invention.

What is claimed is:

1. An apparatus for marking a material and mounting the apparatus on the material so as to fasten the material on to an object, the apparatus comprising:
   a) a first member removeably attachable to the object, said first member being adapted to mark and receive the material, said first member comprising:
      i) a projection for marking the material, said projection projecting from a first side of said first member, said projection having a plurality of teeth; and
      ii) a securing means on a second side of said first member opposite said first side, said securing means removeably attachable to a corresponding securing member mounted with the object; and
   b) a second member adapted to removeably secure the material to said first member, said second member defining an aperture configured to detachably receive said projection and comprising a pawl disposed within said aperture, said pawl configured to engage said plurality of teeth of said projection;
      wherein when said projection is inserted in said aperture in a first direction, said pawl disposed within said aperture engages said plurality of teeth of said projection such that said pawl substantially inhibits said projection from moving in a second direction opposite said first direction; and
      wherein said second member further comprises a lever tab, said lever tab configured to release said pawl from said plurality of teeth when said lever tab is displaced from a first engaged position to a second release position.

2. The apparatus of claim 1 wherein when said lever tab is displaced from said first engaged position to said second release position, said projection may move in said second direction.

3. The apparatus of claim 1 wherein said first side of said first member further comprises a plurality of teeth for engaging the material.

4. The apparatus of claim 1 wherein said securing means is a female socket and said corresponding securing member is a male stud, said female socket and said male stud forming a detachably securable snap fastener.

5. The apparatus of claim 1 wherein said first member and said second member comprises a ratchet system to removeably secure said second member onto said first member.

6. A marking and fastening device for detachably fastening the device onto a material so as to detachably mount the material onto an object, the marking and fastening device comprising:
   a) a male member having a prong on a first side and a securing means on a second side opposite said first side, said prong configured to puncture the material, said securing means configured to mate with a corresponding securing member mounted on the object; and
   b) a female member defining an aperture, said aperture configured to receive said prong so as to detachably secure said female member onto said male member;
      wherein said prong comprises a plurality of teeth;
      wherein said female member comprises a pawl disposed within said aperture, said pawl configured to engage said plurality of teeth of said prong;
      wherein when said prong is inserted in said aperture in a first direction, said pawl disposed within said aperture engages said plurality of teeth of said prong such that said pawl substantially inhibits said prong from moving in a second direction opposite said first direction; and
      wherein said female member further comprises a lever tab, said lever tab configured to release said pawl from said plurality of teeth when said lever tab is displaced from a first engaged position to a second release position.

7. The apparatus of claim 6 wherein said securing means on said second side of said male member is a female socket and said corresponding securing member mounted on the object is a male stud, said female socket and said male stud forming a detachably securable snap fastener.

8. The apparatus of claim 6 wherein said female member and said male member comprises a ratchet system to removeably secure said female member onto said male member.

9. A method of mounting a marking and fastening device onto a material so as to fasten the material onto an object, the method comprising the steps of:
  a) mounting the material on a first member by puncturing the material with a projection projecting from a first side of said first member, said projection comprising a plurality of teeth;
  b) detachably securing said first member onto the material by mating said first member with a second member, said second member defining an aperture configured to receive said projection, said second member comprising a pawl disposed within said aperture, said pawl configured to engage said plurality of teeth of said prong; and
  c) mating a securing means on a second side of said first member with a corresponding securing member mounted on the object so as to fasten the material onto the object;
    wherein when said projection is inserted in said aperture in a first direction, said pawl disposed within said aperture engages said plurality of teeth of said projection such that said pawl substantially inhibits said projection from moving in a second direction opposite said first direction; and
    wherein said female member further comprises a lever tab, said lever tab configured to release said pawl from said plurality of teeth when said lever tab is displaced from a first engaged position to a second release position.

10. The method of claim 9 wherein when said lever tab is displaced from said first engaged position to said second release position, said projection may move in said second direction.

11. The method of claim 10 wherein said securing means on said second side of said first member is a female socket and said securing member mounted on the object is a male stud, said female socket and said male stud forming a detachably securable snap fastener.

12. An apparatus for marking a material and mounting the apparatus on the material so as to fasten the material on to an object, the apparatus comprising:
  a) a first member removeably attachable to the object, said first member comprising a projection for marking the material, said projection projecting from a first side of said first member, said projection being adapted to mark and receive the material and having a plurality of teeth; and
  b) a second member adapted to removeably secure the material to said first member, said second member comprising:
    i) an aperture configured to detachably receive said projection;
    ii) a pawl disposed within said aperture, said pawl configured to move between an engagement position for engaging said plurality of teeth of said projection when said projection is inserted in said aperture in a first direction such that said pawl substantially inhibits said projection from moving in a second direction opposite said first direction and a release position for permitting movement of said projection in said second direction; and
    iii) a lever for moving said pawl to said release position to release said projection.

13. The apparatus of claim 12 wherein said lever comprises a lever tab, said lever tab configured to enable manual movement of said lever to move said pawl to said release position.

14. The apparatus of claim 12 wherein said lever is biased in a direction toward said engagement position by one or more of spring tension and compression.

15. The apparatus of claim 14 wherein the lever is biased by a resiliently deformable connection between the base of the lever and the aperture of the second member.

16. The apparatus of claim 14 wherein said pawl further comprises a plurality of pawl teeth for engaging with the plurality of teeth of said projection wherein said pawl is configured to move beyond the engagement position to successively engage each of the plurality of said pawl teeth in turn with said teeth of said projection upon movement of said projection in said second direction to further inhibit said projection from moving in said second direction.

17. The apparatus of claim 16 wherein said teeth of said projection comprise a first side perpendicular to the axis of the projection for engaging said pawl teeth to substantially inhibit movement of said projection in the second direction.

18. The apparatus of claim 17 wherein said teeth of said projection comprise a second side extending at an angle from a plane perpendicular to the axis of the projection to facilitate movement of said teeth of said projection in the first direction past said pawl teeth.

19. A method of mounting a marking and fastening device onto a material so as to fasten the material onto an object, the method comprising the steps of:
  a) mounting the material at an original material mounting position on a first member by puncturing the material with a projection projecting from a first side of said first member, said projection comprising a plurality of teeth;
  b) detachably securing said first member onto the material by inserting said projection in a first direction into an aperture in a second member so that a pawl in the aperture engages the teeth of the projection such that said pawl substantially inhibits said projection from moving in a second direction opposite said first direction, said pawl comprising a lever moveable to a release position for releasing the pawl from the teeth to permit movement of the second member with respect to the first member in said second direction; and
  c) detachably mating a securing means on a second side of said first member with a corresponding securing member mounted on the object so as to fasten the material onto the object.

20. The method of claim 19 further comprising the steps of:
  d) displacing said lever tab to said release position;
  e) moving second member from said first member;
  f) removing the material from said prong;
  g) mounting said material onto said projection in a different position from said original material mounting position;
  h) detachably securing said first member onto the material by inserting said projection in a first direction into said aperture in said second member so that said pawl in said aperture engages said teeth of the projection.

* * * * *